United States Patent
Zhou et al.

(10) Patent No.: US 11,994,449 B1
(45) Date of Patent: May 28, 2024

(54) METHOD, MEDIUM, AND DEVICE FOR TESTING LUMBAR SPINE PERFORMANCE OF A CRASH TEST DUMMY

(71) Applicants: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

(72) Inventors: Hua Zhou, Tianjin (CN); Zhixin Liu, Tianjin (CN); Weidong Liu, Tianjin (CN); Changqing Yu, Tianjin (CN); Kai Wang, Tianjin (CN); Hanxiao Zhang, Tianjin (CN)

(73) Assignees: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

( * ) Notice: Subject to any disclaimer, the term of this patent is extended or adjusted under 35 U.S.C. 154(b) by 0 days.

(21) Appl. No.: 18/474,210

(22) Filed: Sep. 25, 2023

(30) Foreign Application Priority Data

Feb. 16, 2023 (CN) .......................... 202310119794.2

(51) Int. Cl.
*G01M 7/08* (2006.01)
(52) U.S. Cl.
CPC ..................................... *G01M 7/08* (2013.01)
(58) Field of Classification Search
None
See application file for complete search history.

(56) References Cited

U.S. PATENT DOCUMENTS

| | | | |
|---|---|---|---|
| 6,904,399 B2 | 6/2005 | Cooper et al. | |
| 10,769,967 B2 | 9/2020 | Panzer et al. | |
| 11,514,213 B2 | 11/2022 | Shah et al. | |

FOREIGN PATENT DOCUMENTS

| | | | | |
|---|---|---|---|---|
| CN | 105043707 A | * | 11/2015 | |
| CN | 112115542 A | | 12/2020 | |
| CN | 114705448 A | | 7/2022 | |
| DE | 102015006507 B4 | * | 7/2020 | .......... G01M 17/007 |
| KR | 20010066071 A | * | 12/1999 | ........ G01M 17/0078 |

* cited by examiner

*Primary Examiner* — Peter J Macchiarolo
*Assistant Examiner* — Jermaine L Jenkins
(74) *Attorney, Agent, or Firm* — True Shepherd LLC; Andrew C. Cheng

(57) ABSTRACT

A method for testing the lumbar spine performance of a crash test dummy includes the following steps: selecting a lumbar spine performance test item; collecting data of at least one preset physical quantity during the collision process between the pendulum and the energy-absorbing buffer block through sensors on the lumbar spine assembly; determining whether the data of each preset physical quantity is within the corresponding data channel; if the data of each preset physical quantity is within the corresponding data channel, the lumbar spine assembly is deemed qualified for the current lumbar spine performance test item. This disclosure evaluates the quality of the lumbar spine performance of crash test dummies, allowing only those with better lumbar spine performance to participate in crash tests, and therefore improving the consistency and accuracy of different crash test dummies' response in crash tests.

9 Claims, 10 Drawing Sheets

0° of extension

0° of flexion

45° of flexion

METHOD, MEDIUM, AND DEVICE FOR TESTING LUMBAR SPINE PERFORMANCE OF A CRASH TEST DUMMY

CROSS-REFERENCE TO RELATED APPLICATIONS

This application claims priority to Chinese Patent Application No. 202310119794.2 with a filing date of Feb. 16, 2023. The content of the aforementioned application, including any intervening amendments thereto, is incorporated herein by reference.

FIELD OF THE DISCLOSURE

The present disclosure relates to the field of automotive crash testing technology, particularly to a method, medium, and device for testing lumbar spine performance of a crash test dummy.

BACKGROUND OF THE DISCLOSURE

Due to the inherent risks associated with automotive crash tests, both domestic and international evaluations of vehicle safety rely on crash test dummies. To ensure the accuracy of crash test data obtained from these dummies, it is necessary to conduct calibration tests on various body parts before the crash tests. However, the current calibration tests for frontal crash dummies primarily focus on the head, neck, chest, pelvis, knees, and feet, with limited testing conducted on the lumbar vertebrae. Considering that the lumbar region undergoes certain rotational movements during automotive collisions, the performance of the lumbar vertebrae significantly affects the motion response of the dummy's head, chest, and pelvis. Consequently, the accuracy of automotive crash test results is influenced. Therefore, it is imperative to conduct performance tests specifically targeting the lumbar vertebrae of crash test dummies to identify dummies with satisfactory lumbar spine performance for participation in automotive crash tests.

SUMMARY OF THE DISCLOSURE

In order to address at least one of the aforementioned technical issues, the present disclosure provides a method, system, medium, and device for testing the lumbar spine performance of a crash test dummies.

In a first aspect of the present disclosure, the embodiments of the present disclosure provide a method for testing lumbar spine performance of a crash test dummy. The method is implemented based on a testing equipment. The testing equipment includes a test frame, a pendulum, an energy-absorbing buffer block, and a sensor. A first end of the pendulum is pivotally connected to the test frame, while a second end of the pendulum is connected to a lumbar spine assembly of the crash test dummy. The sensor is mounted on the lumbar spine assembly. The energy-absorbing buffer block is mounted on the test frame. When the lumbar spine assembly is swung to a lowest position, the second end of the pendulum collides with the energy-absorbing buffer block. The method includes: S1, selecting a lumbar spine performance test item; a configuration of the lumbar spine performance test item comprise a maximum collision velocity, whether there is a steel cable, and a testing angle, so that an operator is allowed to assembly the lumbar spine assembly of the crash test dummy based on whether there is the steel cable, to mount the lumbar spine assembly on the second end of the pendulum according to the testing angle, and to swing the pendulum to a corresponding angular position based on the maximum collision velocity; the stiffness of the lumbar spine assembly is greater when there is the steel cable being used compared to when the steel cable is not used, allowing for testing at different stiffness levels of the lumbar spine assembly; S2, collecting, by the sensor on the lumbar spine assembly, data of at least one preset physical quantity during the collision process between the pendulum and the energy-absorbing buffer block; wherein, the pendulum is released, by the operator, after the pendulum reaches the corresponding angular position; S3, determining whether the data of each preset physical quantity is within the corresponding data channel; and S4, if the data of each preset physical quantity is within the corresponding data channel, the lumbar spine assembly is deemed qualified for the current lumbar spine performance test item, and then determining whether the lumbar spine assembly has completed testing for all lumbar spine performance test items; if completed, the lumbar spine performance test for the corresponding lumbar spine assembly of the crash test dummy is deemed qualified, and the testing process is terminated; if not completed, the process returns to S1 to perform testing on the next lumbar spine performance test item; if the data of any preset physical quantity is outside the corresponding data channel, the lumbar spine performance test for the corresponding lumbar spine assembly of the crash test dummy is deemed unqualified, and the testing process is terminated.

In a second aspect of the present disclosure, embodiments of the present disclosure provide a system for testing lumbar spine performance of a crash test dummy. The system is implemented by a testing equipment. The testing equipment includes a test frame, a pendulum, an energy-absorbing buffer block, and a sensor. A first end of the pendulum is pivotally connected to the test frame, while a second end of the pendulum is connected to a lumbar spine assembly of the crash test dummy. The sensor is mounted on the lumbar spine assembly. The energy-absorbing buffer block is mounted on the test frame. When the lumbar spine assembly is swung to a lowest position, the second end of the pendulum collides with the energy-absorbing buffer block. The system includes: an item selection module, a data collection module, a first determination module, and a second determination module. The item selection module is configured for executing step S1, selecting a lumbar spine performance test item; a configuration of the lumbar spine performance test item comprise a maximum collision velocity, whether there is a steel cable, and a testing angle, so that an operator is allowed to assembly the lumbar spine assembly of the crash test dummy based on whether there is the steel cable, to mount the lumbar spine assembly on the second end of the pendulum according to the testing angle, and to swing the pendulum to a corresponding angular position based on the maximum collision velocity; the stiffness of the lumbar spine assembly is greater when there is the steel cable being used compared to when the steel cable is not used, allowing for testing at different stiffness levels of the lumbar spine assembly. The data collection module is configured for executing step S2, collecting, by the sensor on the lumbar spine assembly, data of at least one preset physical quantity during the collision process between the pendulum and the energy-absorbing buffer block; wherein, the pendulum is released, by the operator, after the pendulum reaches the corresponding angular position. The first determination module is configured for executing step S3, determining whether the data of each preset physical quantity is within the corresponding data channel. The second determination module is configured for executing step S4, if the data of each preset physical quantity is within the corresponding data channel, the lumbar spine assembly is deemed qualified for the current lumbar spine performance test item, and then determining whether the lumbar spine assembly has completed testing for all lumbar spine performance test items; if completed, the lumbar spine performance test for the corresponding lumbar spine assembly of the crash test dummy is deemed qualified, and the testing process is terminated; if not completed, the process returns to S1 to perform testing on the next lumbar spine performance test item; if the data of any preset physical quantity is outside the corresponding data channel, the lumbar spine performance test for the corresponding lumbar spine assembly of the crash test dummy is deemed unqualified, and the testing process is terminated.

In a third aspect of the present disclosure, embodiments of the present disclosure provide a computer readable storage medium, storing a computer program thereon. When the computer program is executed in a computer, the computer is caused to perform the method according to the first aspect of the present disclosure.

In a fourth aspect of the present disclosure, embodiments of the present disclosure provide a computing device which includes a memory and a processor. The memory stores executable code, and the processor, when executing the executable code, implements the method according to the first aspect of the present disclosure.

The embodiments of the present disclosure have the following advantages: The method provided in the embodiments of the present disclosure are executed based on the testing equipment. The method includes: selecting a lumbar spine performance test item; collecting data of at least one preset physical quantity during the collision process between the swing rod and the energy-absorbing buffer block through a sensor on the lumbar spine assembly; determining whether the data of each preset physical quantity is within the corresponding data channel; determining whether the lumbar spine assembly is qualified for the current lumbar spine performance test item based on the determination result. Each lumbar spine performance test item is tested using the same method, and if any of the lumbar spine performance test items is unqualified, there is no need to perform the rest of lumbar spine performance test items. When all the lumbar spine performance test items are qualified, it is considered that the lumbar spine assembly of the corresponding crash test dummy has passed the lumbar spine performance testing, and the crash test dummy can participate in automotive crash tests. This approach allows for the evaluation of the quality of lumbar spine performance in crash test dummies and only crash test dummies with better lumbar spine performance are allowed in crash tests, thereby improving the consistency and accuracy of different crash test dummies' responses in crash tests.

BRIEF DESCRIPTION OF THE DRAWINGS

In order to illustrate the specific embodiments of the present disclosure or the technical solutions in the prior art more clearly, the following briefly introduces the accompanying drawings that need to be used in the description of the specific embodiments or the prior art. Obviously, the accompanying drawings in the following description are some embodiments of the present disclosure. For those of ordinary skill in the art, other drawings can also be obtained based on these drawings without creative efforts.

FIG. 4b is a schematic diagram showing the lumbar spine assembly at 0 degrees of flexion within the coordinate system shown in FIG. 4a.

FIG. 4c is a schematic diagram showing the lumbar spine assembly at 0 degrees of extension within the coordinate system shown in FIG. 4a.

FIG. 4d is a schematic diagram showing the lumbar spine assembly at 45 degrees of flexion within the coordinate system shown in FIG. 4a.

Character references: 1—test frame; 2—pendulum; 3—energy-absorbing buffer block; 4—tensioning belt; 5—clamping device; 6—lumbar spine assembly; 7—pulley; 8—lifting motor; 6a—lumbar base; 6b—lumbar vertebra; 6c—upper torso substitute block; 6d—sensor; 6b1—through-hole; 6e—steel cable; 6f—nut.

DETAILED DESCRIPTION OF THE DISCLOSURE

In order to make the objectives, technical solutions and advantages of the present disclosure clearer, the technical solutions of the present disclosure will be described clearly and completely below. Obviously, the described embodiments are only some, but not all, embodiments of the present disclosure. Based on the embodiments of the present disclosure, all other embodiments obtained by those of ordinary skill in the art without creative work fall within the protection scope of the present disclosure.

In a first aspect of the present disclosure, embodiments of the present disclosure provides a method for testing lumbar spine performance of a crash test dummy. The method is implemented based on a testing equipment. The testing equipment includes a test frame, a pendulum, an energy-absorbing buffer block, and a sensor. A first end of the pendulum is pivotally connected to the test frame, while a second end of the pendulum is connected to a lumbar spine assembly of the crash test dummy. The sensor is mounted on the lumbar spine assembly. The energy-absorbing buffer block is mounted on the test frame. When the lumbar spine assembly is swung to a lowest position, the second end of the pendulum collides with the energy-absorbing buffer block.

Figure 1:
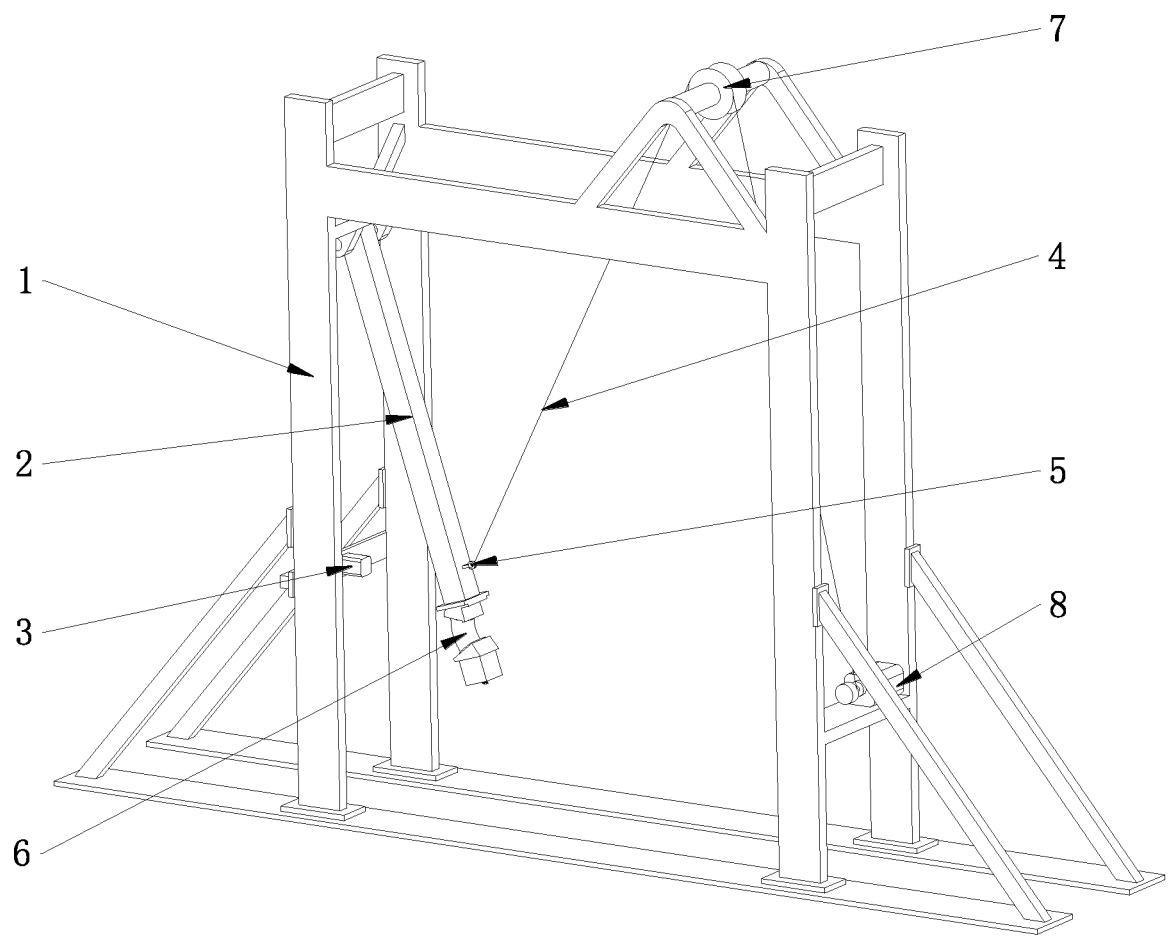
FIG. 1 is an installation schematic diagram showing the testing equipment and the lumbar spine assembly according to one embodiment of the present disclosure.

Referring to FIG. 1, the test frame 1 resembles a gantry and serves the purpose of ensuring stable dynamic testing of the lumbar spine performance. The first end of the pendulum 2 is hinged at the upper portion of the test frame, enabling rotational movement of the pendulum 2 about the first end. The second end of the pendulum is configured for the installation of the lumbar spine assembly 6. The lumbar spine assembly 6 is provided with a sensor 6d. The pendulum 2 facilitates the testing of the lumbar spine assembly 6 through its swinging motion. At the lowest position of the pendulum's rotation, the second end of the pendulum precisely collides with the energy-absorbing buffer block located on the test frame 1. This collision process allows the energy-absorbing buffer block to absorb and dissipate the energy generated during the downward swing of the pendulum 2. The sensor 6d collects various preset physical quantities, providing insights into the changes occurring within the lumbar spine assembly 6 during the collision process.

In one embodiment, for the purpose of achieving controlled lifting of the pendulum, as shown in FIG. 1, the test equipment may further include the following components: tensioning strap 4, clamping device 5, pulley 7, and lifting motor 8. The pulley 7 is positioned on the test frame 1. The tensioning strap 4 is wound around the pulley 7, with one end of the tensioning strap 4 connected to the lifting motor 8, and the other end of the tensioning strap 4 connected to the clamping device 5. The clamping device is attached to the second end of the pendulum 2. When the clamping device 5 is secured to the second end of the pendulum 2, the coordinated interaction of the lifting motor 8, pulley 7, and tensioning strap 4 allows the pendulum 2 to swing to a desired angular position. By loosening the clamping device 5 from the second end of the pendulum 2, the release of the pendulum 2 is achieved.

Namely, by securing the tensioning strap to the second end of the pendulum using the clamping device, and with the tensioning strap passing through the pulley and connected to the lifting motor, the following sequence of actions occurs: when the lifting motor is activated, the tensioning strap is tightened, thereby causing the pendulum to swing upwards. Once the pendulum reaches the predetermined angular position, the lifting motor ceases operation. Subsequently, the clamping device is released, allowing the pendulum to swing freely downward.

Figure 2:
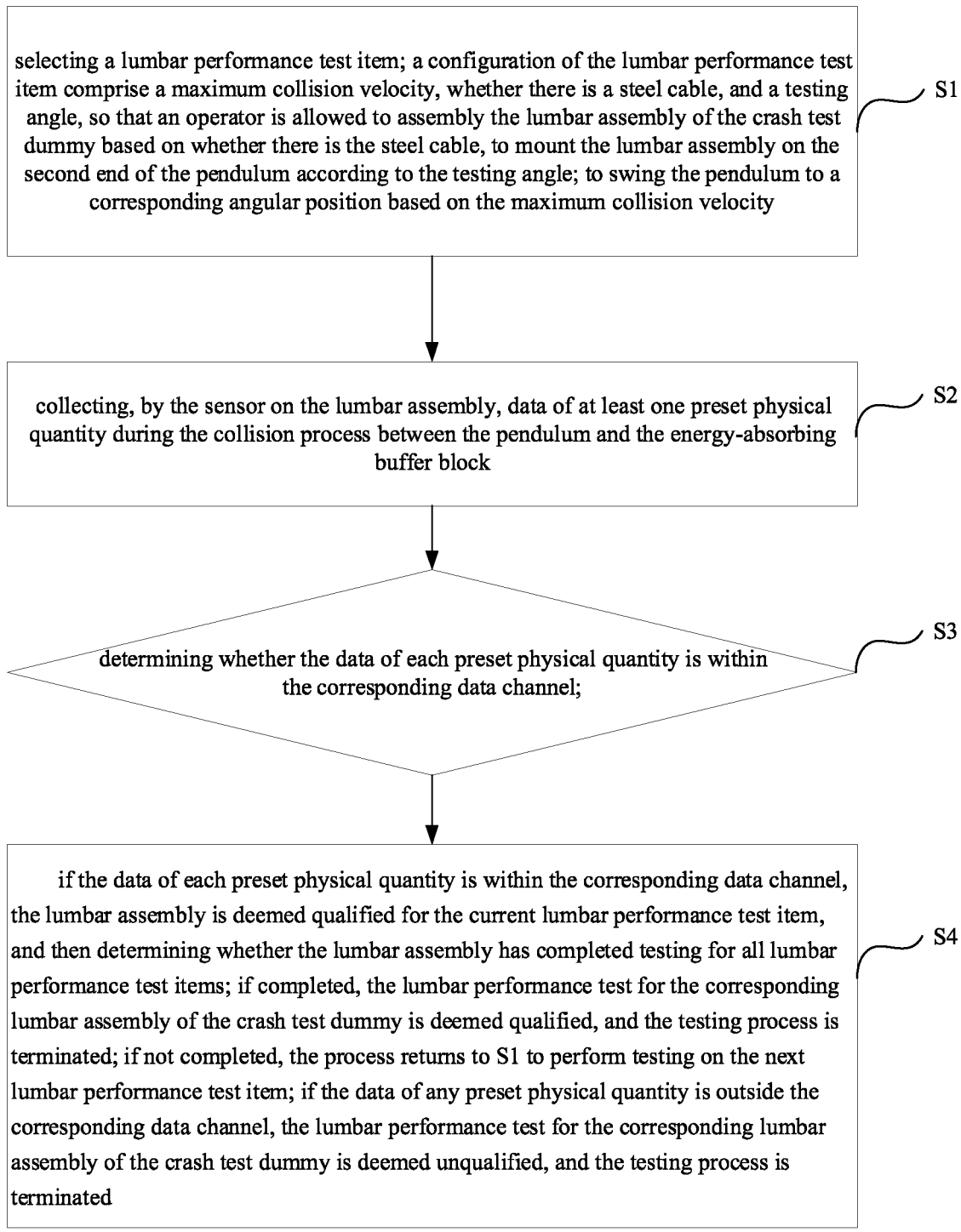
FIG. 2 is a flow diagram showing the method for testing lumbar spine performance of a crash test dummy according to one embodiment of the present disclosure.

Referring to FIG. 2, the method provided in this embodiment of the present disclosure includes the following steps S1-S4.

S1, selecting a lumbar spine performance test item; a configuration of the lumbar spine performance test item comprise a maximum collision velocity, whether there is a steel cable, and a testing angle, so that an operator is allowed to assembly the lumbar spine assembly of the crash test dummy based on whether there is the steel cable, to mount the lumbar spine assembly on the second end of the pendulum according to the testing angle, and to swing the pendulum to a corresponding angular position based on the maximum collision velocity; the stiffness of the lumbar spine assembly is greater when there is the steel cable being used compared to when the steel cable is not used, allowing for testing at different stiffness levels of the lumbar spine assembly.

In practical applications, it is necessary to perform multiple lumbar spine performance test items on a lumbar spine assembly of a crash test dummy. Once a particular lumbar spine performance test item is deemed qualified, the next test item is carried out. This sequential process continues until all lumbar spine performance test items have been conducted, and each one of them has been deemed qualified. Only when all the lumbar spine performance test items are completed and pass, the lumbar spine performance of the crash test dummy is considered satisfactory.

If any lumbar spine performance test item does not meet the qualification criteria, there is no need to proceed with subsequent test items, and the lumbar spine performance of the crash test dummy is deemed unsatisfactory. Only crash test dummies with satisfactory lumbar spine performance are eligible to participate in automotive collision tests. This ensures that the accuracy of automotive collision tests is not compromised due to unsatisfactory lumbar spine performance of the crash test dummy.

In one embodiment, the lumbar spine performance test items may include at least the following:

Lumbar spine performance test item with 0 degrees of flexion, without a steel cable, and a maximum collision velocity of 3.3 m/s.

Lumbar spine performance test item with 0 degrees of flexion, without a steel cable, and a maximum collision velocity of 4.4 m/s.

Lumbar spine performance test item with 0 degrees of flexion, with a steel cable, and a maximum collision velocity of 3.3 m/s.

Lumbar spine performance test item with 0 degrees of flexion, with a steel cable, and a maximum collision velocity of 4.4 m/s.

Lumbar spine performance test item with 0 degrees of flexion, with a steel cable, and a maximum collision velocity of 6.0 m/s.

Lumbar spine performance test item with 45 degrees of flexion, without a steel cable, and a maximum collision velocity of 3.3 m/s.

Lumbar spine performance test item with 45 degrees of flexion, without a steel cable, and a maximum collision velocity of 4.4 m/s.

Lumbar spine performance test item with 45 degrees of flexion, with a steel cable, and a maximum collision velocity of 3.3 m/s.

Lumbar spine performance test item with 45 degrees of flexion, with a steel cable, and a maximum collision velocity of 4.4 m/s.

Lumbar spine performance test item with 45 degrees of flexion, with a steel cable, and a maximum collision velocity of 6.0 m/s.

Lumbar spine performance test item with 0 degrees of extension, with a steel cable, and a maximum collision velocity of 3.3 m/s.

Lumbar spine performance test item with 0 degrees of extension, with a steel cable, and a maximum collision velocity of 4.4 m/s.

Lumbar spine performance test item with 0 degrees of extension, with a steel cable, and a maximum collision velocity of 6.0 m/s.

Figure 3:
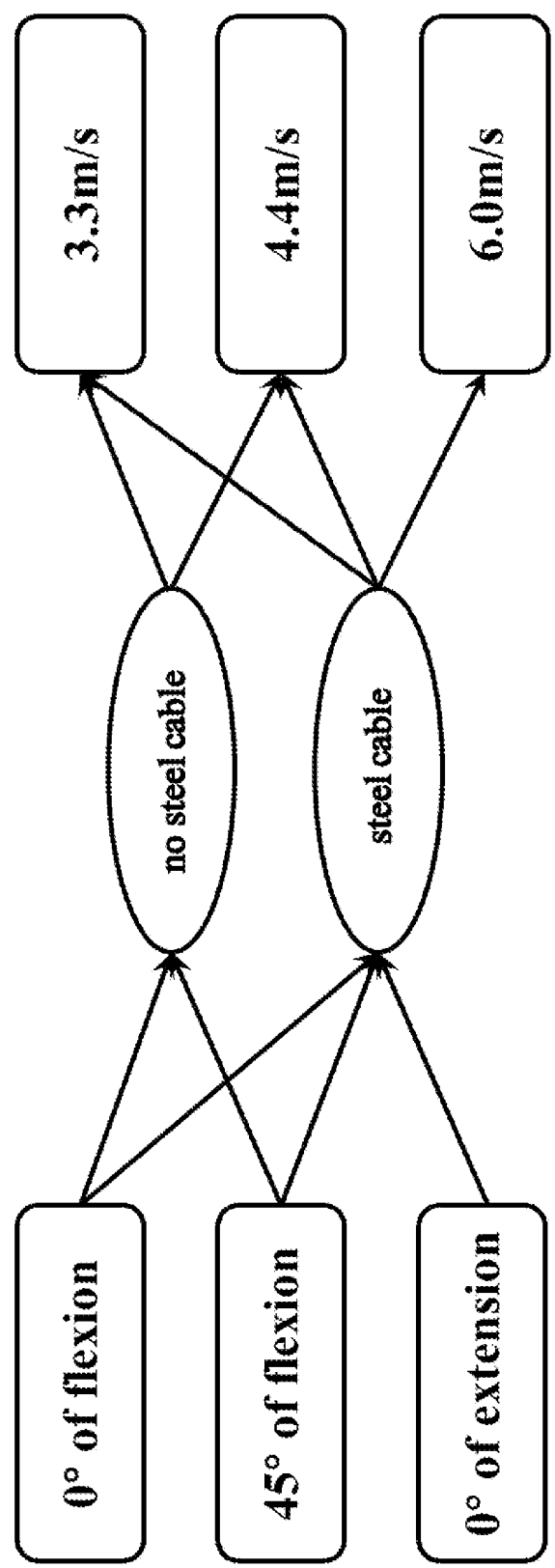
FIG. 3 is a schematic diagram showing the configuration of the lumbar spine performance item according to one embodiment of the present disclosure.
Figure 4A:
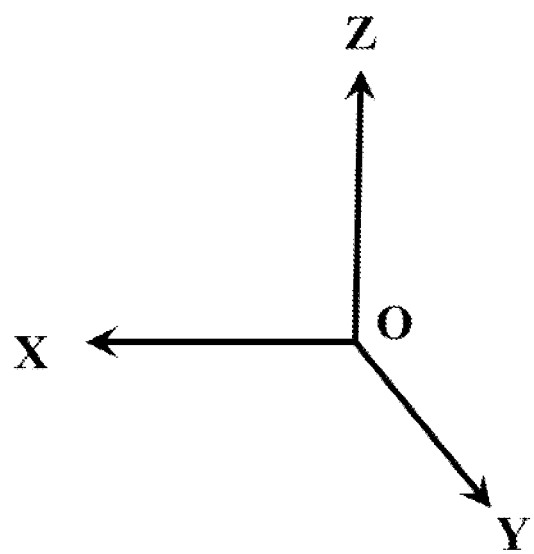
FIG. 4a is a schematic diagram of a coordinate system according to one embodiment of the present disclosure.
Figure 4B:
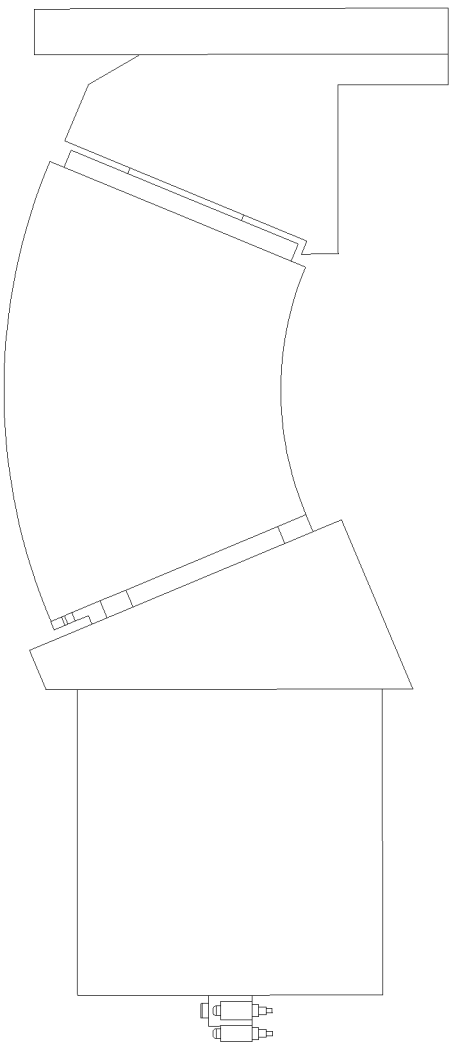
Figure 4C:
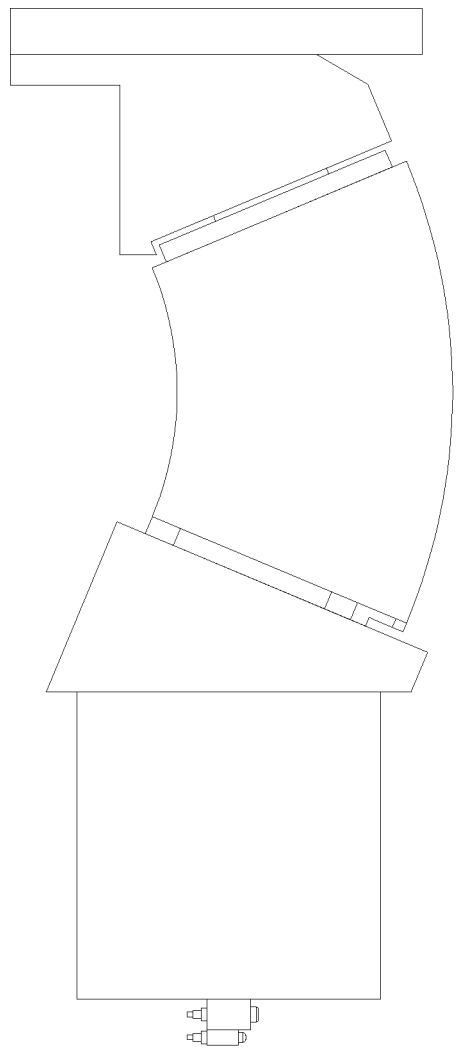
Figure 4D:
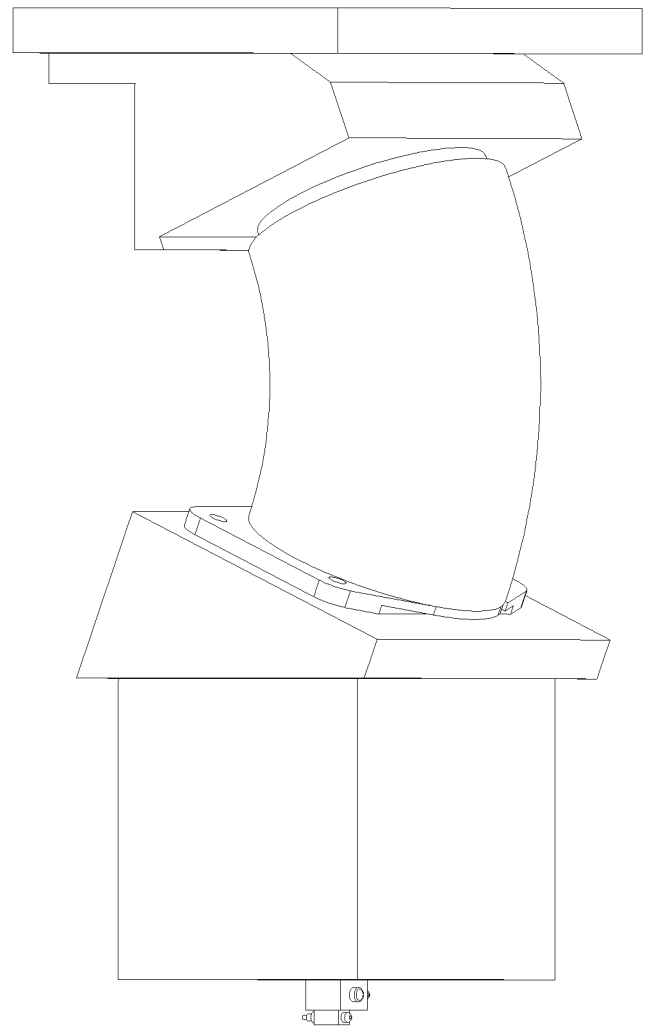

The specific lumbar spine performance test items can be seen in FIG. 3. Due to the increased stiffness of the lumbar spine assembly when equipped with a steel cable, the lumbar spine performance test item with a maximum collision velocity of 6.0 m/s can be conducted.

Referring to FIGS. 4a-4d, the installation position of the sensor is defined as the origin point O of a coordinate system. The direction of forward swinging of the lumbar spine assembly is the X-axis of the coordinate system. The vertical upward direction is the Z-axis, and the direction perpendicular to the swinging plane is the Y-axis. The 0 degrees of flexion refers to the installation direction of the lumbar spine assembly at the second end of the pendulum, where the bending contour of the lumbar spine assembly follows the X-O-Z plane and bends towards the positive direction of the X-axis. Conversely, the 0 degrees of extension refers to the installation direction of the lumbar spine assembly at the second end of the pendulum, where the bending contour of the lumbar spine assembly follows the X-O-Z plane and bends towards the negative direction of the X-axis. The 45 degrees of flexion refers to the installation direction of the lumbar spine assembly at the second end of the pendulum, where the bending contour of the lumbar spine assembly forms 45 degrees angle with respect to the X-O-Z plane and bends towards the positive direction of the X-axis. The bending contour of the lumbar spine assembly refers to the outline of the lumbar spine assembly on a paper plane.

The maximum collision velocity refers to the maximum speed of the lumbar spine assembly at the second end of the pendulum before it reaches the energy-absorbing buffer block. Different maximum collision velocities correspond to different angular positions, and the specific angular position for each maximum collision velocity can be pre-calibrated. By releasing the pendulum when it reaches the calibrated angular position, the lumbar spine assembly can achieve the corresponding maximum collision velocity at its lowest position.

For example, in S1, the first lumbar spine performance test item mentioned above is selected. The configuration of the first lumbar spine performance test item are as follows: maximum collision velocity of 3.3 m/s, no steel cable, and 0 degrees of flexion.

It is understood that after selecting the lumbar spine performance test item, the lumbar spine assembly is assembled according to the configuration of whether or not to use a steel cable. If the configuration indicates the inclusion of a steel cable, the lumbar spine assembly is equipped with a steel cable to enhance its stiffness. On the other hand, if the configuration specifies no steel cable, the lumbar spine assembly is not equipped with a steel cable, resulting in a lower stiffness.

In one embodiment, the lumbar spine assembly includes sequentially connected components: the lumbar base, lumbar vertebra, and upper torso substitute block. The lumbar base is used to connect with the second end of the pendulum. In the case of having a steel cable, the steel cable is threaded through the through-hole on the end face of the lumbar vertebra, between its upper and lower surfaces, to enhance the stiffness of the lumbar spine assembly.

Figure 6:
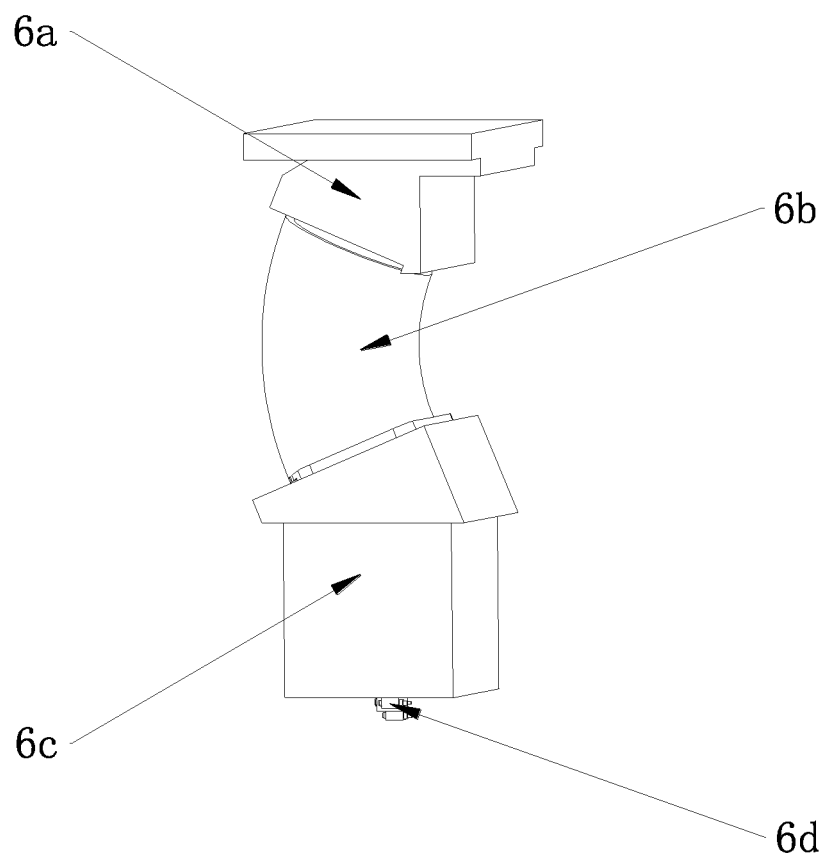
FIG. 6 is a schematic diagram of the lumbar spine assembly and the sensor according to one embodiment of the present disclosure.
Figure 7:
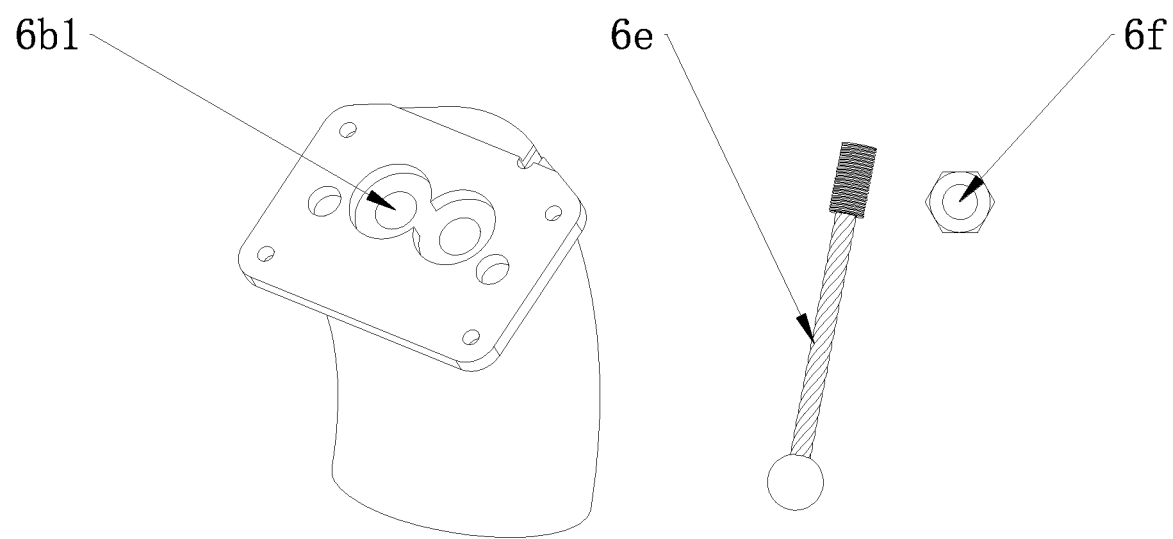
FIG. 7 is a schematic diagram showing the components for the lumbar vertebra according to one embodiment of the present disclosure.

Please refer to FIG. 6 and FIG. 7. When no steel cable is present, the bottom of lumbar vertebra 6b is directly mounted on the lumbar base 6a, and then the top of lumbar vertebra 6b is connected to the upper torso substitute block 6c, which simulates the upper torso. When using a steel cable 6e, first thread the steel cable 6e through the through-hole 6b1 of lumbar vertebra 6b, secure it with nut 6f, and then connect lumbar vertebra 6b, lumbar base 6a, and upper torso substitute block 6c to form the lumbar spine assembly 6. Two steel cables 6e are required, each with two nuts 6f. The torque M for tightening the nuts 6f is uniformly set to 12 N·m using a torque wrench.

In one embodiment, the method provided by the present disclosure may further include the following: prior to installing the lumbar spine assembly onto the pendulum's second end of the testing apparatus for each lumbar spine performance test item, the lumbar spine assembly is to be placed in an environment with a temperature ranging from 20.6° C. to 22.2° C. for a duration of at least 1 hour.

In essence, before the lumbar spine assembly is assembled and installed onto the second end of the pendulum, the fully assembled lumbar spine assembly is to be placed in a specific temperature-controlled environment for a period of time. This practice is aimed at ensuring the accuracy of response results of the lumbar spine performance test.

Moreover, it is also possible to loosen the nuts after completing the lumbar spine performance test items with the steel cable, and readjust the torque of the nuts when conducting the next lumbar spine performance test item with the steel cable.

While placing the lumbar spine assembly in a controlled temperature environment, it is also feasible to install an energy-absorbing buffer block on a crossbeam of the aforementioned testing frame. Once the placement is complete, mount the sensor onto the lumbar spine assembly. Then, in accordance with the testing angle, connect the lumbar spine assembly to the second end of the pendulum. Subsequently, employ the lifting motor to swing the pendulum to the corresponding angular position. At last, release the clamping device, thereby releasing the second end of the pendulum.

In one embodiment, the method provided by the present disclosure may further include replacing the energy-absorbing buffer block before installing the lumbar spine assembly to the second end of the pendulum in the testing equipment. The energy-absorbing buffer blocks used in each lumbar spine performance test item are of the same size and material.

Namely, for each lumbar spine performance test item, a new energy-absorbing buffer block needs to be replaced. To ensure the accuracy of the experiment, the energy-absorbing buffer blocks used in each lumbar spine performance test item are of the same size and material.

Specifically, the energy-absorbing buffer block in each lumbar spine performance test item is a 6-row by 5-column honeycomb aluminum energy-absorbing block. The honeycomb aluminum is made of 3003 series alloy and has a standard specification of 1250 mm×1250 mm.

S2, collecting, by the sensor on the lumbar spine assembly, data of at least one preset physical quantity during the collision process between the pendulum and the energy-absorbing buffer block; wherein, the pendulum is released, by the operator, after the pendulum reaches the corresponding angular position.

In other words, after the pendulum is released, the pendulum freely swings downward. When the lumbar spine assembly reaches its lowest position, the second end of the pendulum achieves the corresponding maximum collision velocity, and then collides with the energy-absorbing buffer block. During the collision process, the energy-absorbing buffer block undergoes deformation, and the physical quantities of the lumbar spine assembly change. For example, by setting n sampling points within a duration T corresponding to the collision process, n data points are collected for each predetermined physical quantity, revealing the changes in these predetermined physical quantities.

In summary, the collision between the pendulum and the energy-absorbing buffer block generates a lumbar flexion or extension test pulse for the dummy, and the data of at least one predetermined physical quantity during the dynamic response of the lumbar spine assembly is collected through the sensor on the lumbar spine assembly.

In one embodiment, the predetermined physical quantities to be collected for the lumbar spine performance test items corresponding to the 0 degrees of flexion and 0 degrees of extension may include at least one of the following: forces along the x-axis and z-axis; accelerations along the x-axis and z-axis; and torque along the y-axis.

In one embodiment, the predetermined physical quantities to be collected for the lumbar spine performance test item corresponding to the 45 degrees of flexion may include at least one of the following: forces along the x-axis, y-axis, and z-axis; accelerations along the x-axis, y-axis, and z-axis; and torque along the x-axis, y-axis, and z-axis.

For the first lumbar spine performance test item among the total 13 lumbar spine performance test items, with 0 degrees of flexion, the predetermined physical quantities to be collected may include forces along the x-axis and z-axis (Fx and Fz); accelerations along the x-axis and z-axis (Ax and Az); and torque along the y-axis (My).

For the last lumbar spine performance test item among the total 13 lumbar spine performance test items, with 45 degrees of flexion, the predetermined physical quantities to be collected may include forces along the x-axis, y-axis, and z-axis (Fx, Fy, and Fz); accelerations along the x-axis, y-axis, and z-axis (Ax, Ay, and Az); and torque along the x-axis, y-axis, and z-axis (Mx, My, and Mz).

S3, determining whether the data of each preset physical quantity is within the corresponding data channel.

Figure 5:
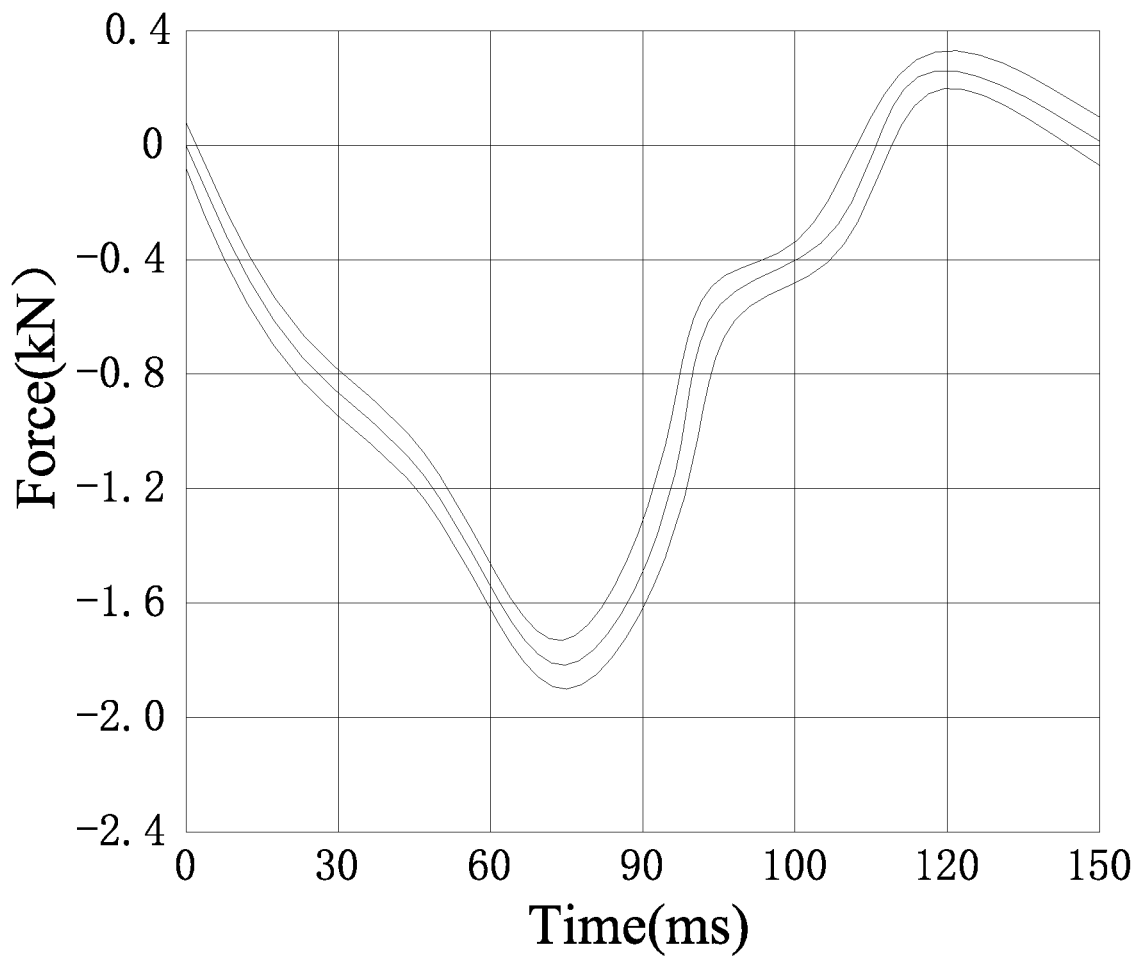
FIG. 5 is a schematic diagram of the data channel for the force exerted in the x-axis direction according to one embodiment of the present disclosure.

Each predetermined physical quantity has its own data channel, which represents the range of data for that physical quantity during the course of time. For instance, refer to FIG. 5, which illustrates the data channel for the force along the x-axis. At each time point, the data channel corresponds to a maximum and minimum value. If the force along the x-axis, collected at a particular time point, falls within the maximum and minimum values of the data channel at that time point, it is considered that the force along the x-axis is within the data channel at the particular time point. If the data for the force along the x-axis at all n sampling points falls within the data channel, it is deemed that the force along the x-axis is within the corresponding data channel. Otherwise, if any of the data points for the force along the x-axis falls outside the data channel, it is considered that the force along the x-axis is outside the corresponding data channel. In FIG. 5, the horizontal axis represents time in milliseconds (ms), and the vertical axis represents force in kilonewtons (KN).

It is to be noted that this determination of being within or outside the data channel applies to each predetermined physical quantity individually.

It is conceivable that prior to performing the determination in S3, it is necessary to calibrate the data channels for each predetermined physical quantity. To accurately evaluate the results of the collision testing response, the Hybrid III 50th percentile lumbar spine calibration procedure specified in SAE J3074 should be followed before conducting the lumbar spine testing. This process involves calibrating and selecting 25 dummy lumbar spine assemblies that meet the calibration requirements. These 25 dummy lumbar spine assemblies will then undergo steps S1 to S2 to obtain n data points for each predetermined physical quantity within a time duration T in each lumbar spine performance test item, resulting in 25 sets of data corresponding to the 25 dummy lumbar spine assemblies. Using the acquired data, the data channels for each predetermined physical quantity in each lumbar spine performance test item can be calculated and plotted. The calculation method is as follows.

In the lumbar spine performance test item with 0 degrees of flexion, having a steel cable, and a test velocity of 3.3 m/s, once the data for the force Fx along the X-axis over time is obtained, the average force and standard deviation can be calculated.

$$\overline{Fx}_i = \frac{1}{25}\sum_{j=1}^{25} Fx_{ij}$$

-continued
$$S_i = sqrt\left(\frac{1}{25}\sum_{j=1}^{25}(Fx_{ij} - \overline{Fx}_i)^2\right)$$

Where, i represents the data point collected within time duration T, i=(1, 2, . . . , n); j represents number of data collection sets, positive integer in the range [1, 25]; $\overline{Fx}_i$ represents average force of the force Fx along the X-axis; $S_i$ represents standard deviation of the force Fx along the X-axis; $Fx_{ij}$ represents the force along the X-axis at the i-th data point in the j-th data collection set. For each data point i, the data channel's range is set to determine at $[\overline{Fx}_i+S_i, \overline{Fx}_i-S_i]$, and therefore the data channel for the force Fx along the X-axis as it varies over time in the lumbar spine performance test item with 0 degrees of flexion, having steel cable, and test velocity of 3.3 m/s. The same calibration process is applied to determine the data channels for other predetermined physical quantities. By following this procedure, data channels for force, acceleration, and torque can be obtained for the 13 lumbar spine performance test items.

S4, if the data of each preset physical quantity is within the corresponding data channel, the lumbar spine assembly is deemed qualified for the current lumbar spine performance test item, and then determining whether the lumbar spine assembly has completed testing for all lumbar spine performance test items; if completed, the lumbar spine performance test for the corresponding lumbar spine assembly of the crash test dummy is deemed qualified, and the testing process is terminated; if not completed, the process returns to S1 to perform testing on the next lumbar spine performance test item; if the data of any preset physical quantity is outside the corresponding data channel, the lumbar spine performance test for the corresponding lumbar spine assembly of the crash test dummy is deemed unqualified, and the testing process is terminated.

Namely, if all the recorded data for each predetermined physical quantity in a lumbar spine performance test fall within their respective data channels, the lumbar spine assembly under evaluation is considered qualified for the lumbar spine performance test. Consequently, the next lumbar spine performance test item can be conducted following the same process as described in steps S1-S4. In the event that any test fails to meet the required criteria, further testing for subsequent performance test items is unnecessary. In such cases, the lumbar spine assembly of the crash test dummy would be deemed unsatisfactory, and it should not be utilized during vehicle collision tests. However, if all the lumbar spine performance tests are successfully completed and meet the necessary standards, the lumbar spine assembly of the crash test dummy would be considered qualified, allowing its utilization in vehicle collision tests.

It is understood that employing this approach enables an assessment of the quality of the crash test dummy's lumbar spine performance. By exclusively involving crash test dummies with superior lumbar spine performance in vehicle collision experiments, the consistency and accuracy of different crash test dummies' responses can be enhanced.

In a second aspect of the present disclosure, embodiments of the present disclosure provide a system for testing lumbar spine performance of a crash test dummy. The system is implemented by a testing equipment. The testing equipment includes a test frame, a pendulum, an energy-absorbing buffer block, and a sensor. A first end of the pendulum is pivotally connected to the test frame, while a second end of the pendulum is connected to a lumbar spine assembly of the crash test dummy. The sensor is mounted on the lumbar spine assembly. The energy-absorbing buffer block is mounted on the test frame. When the lumbar spine assembly is swung to a lowest position, the second end of the pendulum collides with the energy-absorbing buffer block.

The system includes: an item selection module, a data collection module, a first determination module, and a second determination module. The item selection module is configured for executing step S1, selecting a lumbar spine performance test item; a configuration of the lumbar spine performance test item comprise a maximum collision velocity, whether there is a steel cable, and a testing angle, so that an operator is allowed to assembly the lumbar spine assembly of the crash test dummy based on whether there is the steel cable, to mount the lumbar spine assembly on the second end of the pendulum according to the testing angle, and to swing the pendulum to a corresponding angular position based on the maximum collision velocity; the stiffness of the lumbar spine assembly is greater when there is the steel cable being used compared to when the steel cable is not used, allowing for testing at different stiffness levels of the lumbar spine assembly. The data collection module is configured for executing step S2, collecting, by the sensor on the lumbar spine assembly, data of at least one preset physical quantity during the collision process between the pendulum and the energy-absorbing buffer block; wherein, the pendulum is released, by the operator, after the pendulum reaches the corresponding angular position. The first determination module is configured for executing step S3, determining whether the data of each preset physical quantity is within the corresponding data channel. The second determination module is configured for executing step S4, if the data of each preset physical quantity is within the corresponding data channel, the lumbar spine assembly is deemed qualified for the current lumbar spine performance test item, and then determining whether the lumbar spine assembly has completed testing for all lumbar spine performance test items; if completed, the lumbar spine performance test for the corresponding lumbar spine assembly of the crash test dummy is deemed qualified, and the testing process is terminated; if not completed, the process returns to S1 to perform testing on the next lumbar spine performance test item; if the data of any preset physical quantity is outside the corresponding data channel, the lumbar spine performance test for the corresponding lumbar spine assembly of the crash test dummy is deemed unqualified, and the testing process is terminated.

In one embodiment, the test equipment may further include a tensioning strap, a clamping device, a pulley, and a lifting motor. The pulley is positioned on the test frame. The tensioning strap is wound around the pulley, with one end of the tensioning strap connected to the lifting motor, and the other end of the tensioning strap connected to the clamping device. The clamping device is attached to the second end of the pendulum. When the clamping device is secured to the second end of the pendulum, the coordinated interaction of the lifting motor, the pulley, and the tensioning strap allows the pendulum to swing to a desired angular position. By loosening the clamping device from the second end of the pendulum, the release of the pendulum is achieved.

In one embodiment, prior to installing the lumbar spine assembly onto the pendulum's second end of the testing apparatus for each lumbar spine performance test item, the lumbar spine assembly is to be placed in an environment with a temperature ranging from 20.6° C. to 22.2° C. for a duration of at least 1 hour.

In one embodiment, the energy-absorbing buffer block is replaced before installing the lumbar spine assembly to the second end of the pendulum in the testing equipment. The energy-absorbing buffer blocks used in each lumbar spine performance test item are of the same size and material.

In one embodiment, the lumbar spine assembly includes sequentially connected components: the lumbar base, lumbar vertebra, and upper torso substitute block. The lumbar base is used to connect with the second end of the pendulum. In the case of having a steel cable, the steel cable is threaded through the through-hole on the end face of the lumbar vertebra, between its upper and lower surfaces, to enhance the stiffness of the lumbar spine assembly.

In one embodiment, the lumbar spine performance test items include at least the following: lumbar spine performance test item with 0 degrees of flexion, without a steel cable, and a maximum collision velocity of 3.3 m/s; lumbar spine performance test item with 0 degrees of flexion, without a steel cable, and a maximum collision velocity of 4.4 m/s; lumbar spine performance test item with 0 degrees of flexion, with a steel cable, and a maximum collision velocity of 3.3 m/s; lumbar spine performance test item with 0 degrees of flexion, with a steel cable, and a maximum collision velocity of 4.4 m/s; lumbar spine performance test item with 0 degrees of flexion, with a steel cable, and a maximum collision velocity of 6.0 m/s; lumbar spine performance test item with 45 degrees of flexion, without a steel cable, and a maximum collision velocity of 3.3 m/s; lumbar spine performance test item with 45 degrees of flexion, without a steel cable, and a maximum collision velocity of 4.4 m/s; lumbar spine performance test item with 45 degrees of flexion, with a steel cable, and a maximum collision velocity of 3.3 m/s; lumbar spine performance test item with 45 degrees of flexion, with a steel cable, and a maximum collision velocity of 4.4 m/s; lumbar spine performance test item with 45 degrees of flexion, with a steel cable, and a maximum collision velocity of 6.0 m/s; lumbar spine performance test item with 0 degrees of extension, with a steel cable, and a maximum collision velocity of 3.3 m/s; lumbar spine performance test item with 0 degrees of extension, with a steel cable, and a maximum collision velocity of 4.4 m/s; lumbar spine performance test item with 0 degrees of extension, with a steel cable, and a maximum collision velocity of 6.0 m/s.

In one embodiment, the predetermined physical quantities to be collected for the lumbar spine performance test items corresponding to the 0 degrees of flexion and 0 degrees of extension may include at least one of the following: forces along the x-axis and z-axis; accelerations along the x-axis and z-axis; and torque along the y-axis.

In one embodiment, the predetermined physical quantities to be collected for the lumbar spine performance test item corresponding to the 45 degrees of flexion may include at least one of the following: forces along the x-axis, y-axis, and z-axis; accelerations along the x-axis, y-axis, and z-axis; and torque along the x-axis, y-axis, and z-axis.

It should be understood that the explanations, specific implementation methods, advantageous effects, and examples regarding the content of the computer-readable media provided in the embodiments of the present disclosure can be found in the corresponding sections of the first aspect provided, and will not be reiterated here.

In a third aspect of the present disclosure, embodiments of the present disclosure provide a computer readable storage medium, storing a computer program thereon. When the computer program is executed in a computer, the computer is caused to perform the method according to the first aspect of the present disclosure.

Specifically, a system or device equipped with a storage medium is provided. Said storage medium stores software program code that implements the functionality of any of the embodiments described above. The computer (or CPU, MPU) of the said system or device reads and executes the program code stored in the storage medium.

In this scenario, the program code itself, when read from the storage medium, can realize the functionality of any of the embodiments described above. Therefore, the program code and the storage medium containing the program code form part of the present disclosure.

Examples of storage media for providing program code include floppy disks, hard drives, magnetic optical disks, CDs (such as CD-ROM, CD-R, CD-RW, DVD-ROM, DVD-RAM, DVD-RW, DVD+RW), magnetic tapes, non-volatile memory cards, and ROM. Alternatively, the program code can be downloaded from a server computer via a communication network.

Furthermore, it should be understood that not only can the functionality of any of the embodiments be achieved by executing the program code read by the computer, but also by using instructions based on the program code to operate the operating system on the computer, either partially or entirely, to perform the actual operations.

Additionally, it can be understood that the program code read from the storage medium can be written into the memory set in an expansion board inserted into the computer or the memory of an expansion module connected to the computer. Subsequently, based on instructions derived from the program code, the CPU or other components installed on the expansion board or expansion module can execute partial or complete actual operations, thereby achieving the functionality of any of the embodiments described above.

It should be further understood that the explanations, specific implementation methods, advantageous effects, and examples regarding the content of the computer-readable media provided in the embodiments of the present disclosure can be found in the corresponding sections of the first aspect provided, and will not be reiterated here.

The various embodiments described in this specification are presented in a progressive manner, with reference to each other for similarities and cross-referencing, highlighting the differences between them. In particular, for device embodiments, as they are fundamentally similar to method embodiments, their descriptions are kept concise, referring to the relevant sections of the method embodiments for further details.

Those skilled in the art should appreciate that the functionality described in the present disclosure can be implemented using hardware, software, firmware, or any combination thereof. When implemented using software, these functions can be stored in a computer-readable medium or transmitted as one or more instructions or code on a computer-readable medium.

It should be noted that the terms used in the present disclosure are used to describe specific embodiments and do not limit the scope of the claims. As shown in this specification, unless otherwise explicitly indicated by the context, terms such as "one," "a," "an," and/or "the" are not specifically limited to singular form and may include plural forms. The terms "comprise," "including," or any other variations thereof, are intended to cover non-exclusive inclusion, such that a process, method, or device that includes a series of elements encompasses not only those elements explicitly listed but also additional elements not explicitly listed or inherent to such process, method, or device. In the absence of further limitations, the use of the phrase "comprising a . . . " to describe an element does not exclude the presence of other identical elements in a process, method, or device that includes the described element.

Furthermore, it should be clarified that terms such as "center," "upper," "lower," "left," "right," "vertical," "horizontal," "inside," "outside," and similar directional or positional relationships are based on the orientations or positions shown in the drawings for the purpose of describing the present disclosure and simplifying the description. They do not indicate or imply that the devices or components referred to must have specific orientations, be constructed or operated in specific orientations. Therefore, they should not be understood as limitations to the present disclosure. Unless otherwise specified and limited, terms such as "mount," "connect," "attach," and the like should be broadly interpreted. For example, they can refer to fixed connections, detachable connections, or integral connections; mechanical connections or electrical connections; direct connections or indirect connections through intermediate media; or connections within two components. Those skilled in the art can understand the specific meanings of these terms in the context of the present disclosure.

Finally, it should be noted that the above embodiments are provided for the purpose of illustrating the technical solutions of the present disclosure and are not intended to limit the scope thereof. Although detailed descriptions have been provided with reference to the aforementioned embodiments, those skilled in the art should understand that modifications can be made to the technical solutions described in the aforementioned embodiments, or equivalent replacements can be made to some or all of the technical features. Such modifications or replacements do not depart from the essence of the technical solutions of the various embodiments of the present disclosure.

What is claimed is:

1. A method for testing lumbar spine performance of a crash test dummy, wherein the method is implemented based on a testing equipment; the testing equipment comprises a test frame, a pendulum, an energy-absorbing buffer block, and a sensor; a first end of the pendulum is pivotally connected to the test frame, while a second end of the pendulum is connected to a lumbar spine assembly of the crash test dummy; the sensor is mounted on the lumbar spine assembly; the energy-absorbing buffer block is mounted on the test frame; when the lumbar spine assembly is swung to a lowest position, the second end of the pendulum collides with the energy-absorbing buffer block;

the method comprises:

S1, selecting a lumbar spine performance test item; a configuration of the lumbar spine performance test item comprise a maximum collision velocity, whether there is a steel cable, and a testing angle, so that an operator is allowed to assembly the lumbar spine assembly of the crash test dummy based on whether there is the steel cable, to mount the lumbar spine assembly on the second end of the pendulum according to the testing angle, and to swing the pendulum to a corresponding angular position based on the maximum collision velocity; the stiffness of the lumbar spine assembly is greater when there is the steel cable being used compared to when the steel cable is not used, allowing for testing at different stiffness levels of the lumbar spine assembly;

S2, collecting, by the sensor on the lumbar spine assembly, data of at least one preset physical quantity during the collision process between the pendulum and the energy-absorbing buffer block; wherein, the pendulum is released, by the operator, after the pendulum reaches the corresponding angular position;

S3, determining whether the data of each preset physical quantity is within the corresponding data channel; and S4, if the data of each preset physical quantity is within the corresponding data channel, the lumbar spine assembly is deemed qualified for the current lumbar spine performance test item, and then determining whether the lumbar spine assembly has completed testing for all lumbar spine performance test items; if completed, the lumbar spine performance test for the corresponding lumbar spine assembly of the crash test dummy is deemed qualified, and the testing process is terminated; if not completed, the process returns to S1 to perform testing on the next lumbar spine performance test item; if the data of any preset physical quantity is outside the corresponding data channel, the lumbar spine performance test for the corresponding lumbar spine assembly of the crash test dummy is deemed unqualified, and the testing process is terminated.

2. The method according to claim 1, wherein the testing equipment further comprises a tensioning belt, a clamping device, a pulley, and a lifting motor; the pulley is positioned on the test frame; the tensioning belt is wound around the pulley, with one end of the tensioning belt connected to the lifting motor, and the other end of the tensioning belt connected to the clamping device; the clamping device is configured to connected with the second end of the pendulum; when the clamping device is clamped to the second end of the pendulum, the pendulum is swung to the corresponding angular position through the cooperation of the lifting motor, the pulley, and the tensioning belt; by loosening the clamping device, the second end of the pendulum is released.

3. The method according to claim 1, further comprising: before mounting the lumbar spine assembly to the second end of the pendulum in each lumbar spine performance test item, placing the lumbar spine assembly in an environment with a temperature of 20.6° C.-22.2° C. for at least 1 hour.

4. The method according to claim 1, further comprising: before mounting the lumbar spine assembly to the second end of the pendulum in each lumbar spine performance test item, replacing the energy-absorbing buffer block; the energy-absorbing buffer blocks used in each lumbar spine performance test item are of the same size and material.

5. The method according to claim 1, wherein the lumbar spine assembly comprises a lumbar base, a lumbar vertebra, and an upper torso substitute block that are sequentially connected; wherein the lumbar base is configured to connect with the second end of the pendulum; when there is the steel cable, the steel cable is threaded through a through-hole on the end face of the lumbar vertebra, between the upper and lower end faces of the lumbar vertebra, to enhance the stiffness of the lumbar spine assembly.

6. The method according to claim 1, wherein the lumbar spine performance test item comprises at least one of the following:

lumbar spine performance test item with 0 degrees of flexion, without the steel cable, and the maximum collision velocity of 3.3 m/s;

lumbar spine performance test item with 0 degrees of flexion, without the steel cable, and a maximum collision velocity of 4.4 m/s;

lumbar spine performance test item with 0 degrees of flexion, with the steel cable, and a maximum collision velocity of 3.3 m/s;

lumbar spine performance test item with 0 degrees of flexion, with the steel cable, and a maximum collision velocity of 4.4 m/s;

lumbar spine performance test item with 0 degrees of flexion, with the steel cable, and a maximum collision velocity of 6.0 m/s;

lumbar spine performance test item with 45 degrees of flexion, without the steel cable, and a maximum collision velocity of 3.3 m/s;

lumbar spine performance test item with 45 degrees of flexion, without the steel cable, and a maximum collision velocity of 4.4 m/s;

lumbar spine performance test item with 45 degrees of flexion, with the steel cable, and a maximum collision velocity of 3.3 m/s;

lumbar spine performance test item with 45 degrees of flexion, with the steel cable, and a maximum collision velocity of 4.4 m/s;

lumbar spine performance test item with 45 degrees of flexion, with the steel cable, and a maximum collision velocity of 6.0 m/s;

lumbar spine performance test item with 0 degrees of extension, with the steel cable, and a maximum collision velocity of 3.3 m/s;

lumbar spine performance test item with 0 degrees of extension, with the steel cable, and a maximum collision velocity of 4.4 m/s; and lumbar spine performance test item with 0 degrees of extension, with the steel cable, and a maximum collision velocity of 6.0 m/s.

7. The method according to claim 6, wherein for the lumbar spine performance test item corresponding to 0 degrees of flexion and 0 degrees of extension, the preset physical quantities to be collected comprise at least one of the following:

forces along an x-axis and a z-axis;
accelerations along the x-axis and the z-axis; and
torques along a y-axis;
for the lumbar spine performance test item corresponding to 45 degrees of flexion, the preset physical quantities to be collected comprises at least one of the following:
forces along the x-axis, y-axis, and z-axis;
accelerations along the x-axis, y-axis, and z-axis; and
torques along the x-axis, y-axis, and z-axis.

8. A computer non-transitory readable storage medium storing a computer program thereon, wherein when the computer program is executed in a computer, the computer is caused to perform the method according to claim 1.

9. A computing device, comprising a memory and a processor, wherein the memory stores executable code, and the processor, when executing the executable code, implements the method according to claim 1.

* * * * *